United States Patent
Oita et al.

(10) Patent No.: US 9,599,129 B2
(45) Date of Patent: Mar. 21, 2017

(54) AUTOMATIC TRANSMISSION FOR VEHICLE

(75) Inventors: Shinji Oita, Toyota (JP); Masaru Morise, Nukata-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/360,171

(22) PCT Filed: Nov. 22, 2011

(86) PCT No.: PCT/JP2011/076956
§ 371 (c)(1),
(2), (4) Date: May 22, 2014

(87) PCT Pub. No.: WO2013/076827
PCT Pub. Date: May 30, 2013

(65) Prior Publication Data
US 2014/0298790 A1    Oct. 9, 2014

(51) Int. Cl.
*F16H 31/00*    (2006.01)
*F15B 15/02*    (2006.01)
(Continued)

(52) U.S. Cl.
CPC ............ *F15B 15/02* (2013.01); *F16D 25/061* (2013.01); *F16H 3/663* (2013.01); *F16H 57/10* (2013.01);
(Continued)

(58) Field of Classification Search
CPC .............................. F16H 2200/003–2200/2092
See application file for complete search history.

(56) References Cited

U.S. PATENT DOCUMENTS 4,823,641 A * 4/1989 Kuhn ...................... F16H 3/663
475/277
5,938,559 A * 8/1999 Sumi ............................ 475/278
(Continued)

FOREIGN PATENT DOCUMENTS

EP    1 838 977 A1    10/2007
JP    53 147334    12/1978
(Continued)

OTHER PUBLICATIONS

International Search Report Issued Feb. 28, 2012 in PCT/JP11/076956 Filed Nov. 22, 2011.

*Primary Examiner* — Tisha Lewis
(74) *Attorney, Agent, or Firm* — Oblon, McClelland, Maier & Neustadt, L.L.P.

(57) ABSTRACT

A vehicle automatic transmission of a multistage type includes multiple engagement elements having an engagement state switched by an oil pressure to selectively establish a plurality of shift stages based on a combination of engagement and release of the multiple engagement elements according to an oil pressure supplied from a hydraulic circuit, each of the shift stages being established by engagement of two or more engagement elements of the multiple engagement elements, at least one of the multiple engagement elements being a normally closed engagement element engaged when no oil pressure is supplied from the hydraulic circuit, and the normally closed engagement element being a meshing engagement element.

8 Claims, 5 Drawing Sheets

(51) Int. Cl.
*F16D 25/061* (2006.01)
*F16H 3/66* (2006.01)
*F16H 57/10* (2006.01)
*F16H 63/30* (2006.01)

(52) U.S. Cl.
CPC . *F16H 63/3023* (2013.01); *F16H 2063/3093* (2013.01); *F16H 2200/0052* (2013.01); *F16H 2200/2007* (2013.01); *F16H 2200/2023* (2013.01); *F16H 2200/2043* (2013.01); *F16H 2200/2064* (2013.01); *F16H 2200/2082* (2013.01)

(56) References Cited

U.S. PATENT DOCUMENTS

| | | | |
|---|---|---|---|
| 7,828,096 B2 * | 11/2010 | Hoher et al. | 180/65.6 |
| 7,846,059 B2 * | 12/2010 | Maucher et al. | 475/296 |
| 2004/0043857 A1 * | 3/2004 | Nishida et al. | 475/125 |
| 2004/0072648 A1 | 4/2004 | Dreibholz et al. | |
| 2005/0115346 A1 | 6/2005 | Sakamoto et al. | |
| 2006/0172856 A1 | 8/2006 | Takagi | |
| 2007/0186703 A1 | 8/2007 | Sakamoto et al. | |
| 2010/0130323 A1 | 5/2010 | Gumpoltsberger | |
| 2011/0108384 A1 * | 5/2011 | Reisch et al. | 192/69 |
| 2012/0083373 A1 | 4/2012 | Ziemer | |
| 2012/0083374 A1 | 4/2012 | Ziemer et al. | |

FOREIGN PATENT DOCUMENTS

| | | |
|---|---|---|
| JP | 01-501725 A | 6/1989 |
| JP | 05-010847 U | 2/1993 |
| JP | 2005 114107 | 4/2005 |
| JP | 2006-207699 A | 8/2006 |
| JP | 2010-526975 A | 8/2010 |
| JP | 2011 69396 | 4/2011 |
| JP | 2011-069396 A | 4/2011 |
| JP | 2011-226527 A | 11/2011 |
| JP | 2012122569 A * | 6/2012 |
| WO | 2010 139556 | 12/2010 |
| WO | 2010 139558 | 12/2010 |

* cited by examiner

|  | ENGAGEMENT/RELEASE ||||| PRESENCE/ABSENCE OF GENERATION OF OIL PRESSURE |||||
|---|---|---|---|---|---|---|---|---|---|---|
|  | C1 | C2 | B1 | B2 | B3 | C1 | C2 | B1 | B2 | B3 |
| 1ST | O |  |  | O |  | O | × | × | × | × |
| 2ND | O |  | O |  |  | O | × | O | O | × |
| 3RD | O |  |  |  | O | O | × | × | O | O |
| 4TH | O | O |  |  |  | O | O | × | O | × |
| 5TH |  | O |  |  | O | × | O | × | O | O |
| 6TH |  | O | O |  |  | × | O | O | O | × |
| R |  |  |  | O | O | × | × | × | × | O |

|  | ENGAGEMENT/RELEASE ||||| PRESENCE/ABSENCE OF GENERATION OF OIL PRESSURE |||||
|---|---|---|---|---|---|---|---|---|---|---|
|  | C1 | C2 | B1 | B2 | B3 | C1 | C2 | B1 | B2 | B3 |
| 1ST | ○ |  |  | ○ |  | ○ | × | ○ | × | × |
| 2ND | ○ |  | ○ |  |  | ○ | × | × | ○ | × |
| 3RD | ○ |  |  |  | ○ | ○ | × | ○ | ○ | ○ |
| 4TH | ○ | ○ |  |  |  | ○ | ○ | ○ | ○ | × |
| 5TH |  | ○ |  |  | ○ | × | ○ | ○ | ○ | ○ |
| 6TH |  | ○ | ○ |  |  | × | ○ | × | ○ | × |
| R |  |  |  | ○ | ○ | × | × | ○ | × | ○ |

AUTOMATIC TRANSMISSION FOR VEHICLE

TECHNICAL FIELD

The present invention relates to a vehicle automatic transmission and particularly to an improvement for simplifying a device configuration.

BACKGROUND ART

A multistage vehicle automatic transmission is known that includes multiple engagement elements having an engagement state switched by an oil pressure so as to selectively establish a plurality of shift stages based on a combination of engagement and release of the multiple engagement elements corresponding to an oil pressure supplied from a hydraulic circuit. Although clutches and brakes including wet friction materials have been widely used as the engagement elements in such an automatic transmission, these friction materials have been considered to have a problem of a loss due to drag occurring when these friction materials are not engaged. Additionally, an automatic transmission including the hydraulic engagement elements uses a large number of oil pressures at the times of start, stop, and economy running and therefore results in an increase in size of an oil pump or the necessity to dispose an electric oil pump, which puts a limitation on a configuration. Therefore, an automatic transmission has been proposed that uses a meshing engagement element, i.e., a so-called dog clutch (meshing clutch) as a substitute for a wet friction material. For example, this corresponds to an automatic transmission depicted in Patent Document 1.

PRIOR ART DOCUMENTS

Patent Documents

Patent Document 1: WO 2010/139558
Patent Document 2: WO 2010/139556
Patent Document 3: Japanese Laid-Open Patent Publication No. 2011-069396

SUMMARY OF THE INVENTION

Problem to be Solved by the Invention

However, although occurrence of drag can be suppressed by substituting a dog clutch for a wet friction material in the conventional technique, the inconvenience of using a large number of oil pressures at the times of start, stop, and economy running cannot be eliminated and the limitation on configuration still remains. As a result of extensive research for improving performance of a vehicle automatic transmission, the inventers completed the present invention.

The present invention was conceived in view of the situations and it is therefore an object of the present invention to provide a vehicle automatic transmission with a simplified device configuration.

Means for Solving the Problem

To achieve the object, the first aspect of the present invention provides a vehicle automatic transmission of a multistage type including multiple engagement elements having an engagement state switched by an oil pressure to selectively establish a plurality of shift stages based on a combination of engagement and release of the multiple engagement elements according to an oil pressure supplied from a hydraulic circuit, wherein each of the shift stages is established by engagement of two or more engagement elements of the multiple engagement elements, at least one of the multiple engagement elements is a normally closed engagement element engaged when no oil pressure is supplied from the hydraulic circuit, and the normally closed engagement element is a meshing engagement element.

Effects of the Invention

As described above, according to the first aspect of the invention, in the vehicle automatic transmission of a multistage type including multiple engagement elements having an engagement state switched by an oil pressure to selectively establish a plurality of shift stages based on a combination of engagement and release of the multiple engagement elements corresponding to an oil pressure supplied from the hydraulic circuit, each of the shift stages is established by engagement of two or more engagement elements of the multiple engagement elements, at least one of the multiple engagement elements is a normally closed engagement element engaged when no oil pressure is supplied from the hydraulic circuit, and, the normally closed engagement element is a meshing engagement element and, therefore, the limitation on the configuration of the hydraulic circuit becomes smaller and an oil pump can be reduced in size. Moreover, the occurrence of drag can preferably be suppressed by including at least one meshing engagement element engaged when no oil pressure is supplied from the hydraulic circuit. Thus, the vehicle automatic transmission with a simplified device configuration can be provided.

The third aspect of the present invention depending on the first aspect of the invention provides the vehicle automatic transmission, wherein when a first stage having a largest shift ratio of forward shift stages is established in the automatic transmission, at least one of the multiple engagement elements engaged is the normally closed engagement element. Consequently, the automatic transmission can be provided that has a simplified configuration in a pratical form. Additionally, a garage shock at the engine start can be reduced.

The fourth aspect of the present invention depending on the first aspect of the invention provides the vehicle automatic transmission, wherein when a reverse shift stage is established in the automatic transmission, at least one of the multiple engagement elements engaged is the normally closed engagement element. Consequently, the automatic transmission can be provided that has a simplified configuration in a practical form.

The fifth aspect of the present invention depending on the third aspect of the invention provides the vehicle automatic transmission, wherein when the first shift stage is established in the automatic transmission, at least one of the multiple engagement elements engaged is a normally opened engagement element released when no oil pressure is supplied from the hydraulic circuit. Consequently, the automatic transmission can be provided that has a simplified configuration in a practical form.

The sixth aspect of the present invention depending on the fourth aspect of the invention provides the vehicle automatic transmission, wherein when the reverse shift stage is established in the automatic transmission, at least one of the multiple engagement elements engaged is a normally opened engagement element released when no oil pressure is supplied from the hydraulic circuit. Consequently, the automatic transmission can be provided that has a simplified configuration in a practical form.

The seventh aspect of the present invention depending on the first aspect of the invention, the third aspect of the invention, the fourth aspect of the invention, the fifth aspect of the invention, or the sixth aspect of the invention provides the vehicle automatic transmission, wherein two meshing brakes are included as the normally closed engagement elements, and wherein rotating elements fixed to a non-rotating member by engagement of the respective meshing brakes are directly or indirectly coupled to an output rotating member of the automatic transmission. Consequently, the automatic transmission can be provided that has a simplified configuration in a practical form and, additionally, because the output rotating member is fixed to the non-rotating member while no oil pressure is supplied from the hydraulic circuit, the necessity of a configuration for a parking lock is advantageously eliminated.

MODES FOR CARRYING OUT THE INVENTION

The normally closed engagement element is preferably a meshing engagement device (dog clutch) that includes a pair of engagement members having claw portions engaged with each other corresponding to a pair of respective members to be engaged (prevented from relatively rotating) or released (allowed to relatively rotate) and that has an engagement state switched by the pair of the engagement members relatively moved depending on an oil pressure supplied from a hydraulic circuit. Preferably, the normally closed engagement element is an engagement device that includes, for example, a cylinder, a piston disposed to be reciprocable in the cylinder, and a spring biasing the piston in the engagement direction of the claw portions such that the engagement device is engaged when no oil pressure is supplied because the piston is moved in the direction of meshing the claw portions due to a biasing force of the spring, while the engagement device is released when an oil pressure is supplied because the piston is moved in the direction of releasing the meshing of the claw portions against the biasing force of the spring.

The normally closed engagement element is preferably a brake engaged to fix a rotating member to a non-rotating member and more preferably a meshing brake. The normally closed engagement element is preferably engaged at the first shift stage having the largest shift ratio of the forward shift stages and at the reverse shift stage. In other words, the automatic transmission engages at least the normally closed engagement element at the first shift stage having the largest shift ratio of the forward shift stages and at the reverse shift stage. The normally closed engagement element may be a friction engagement device and produces a certain effect of the present invention in such a form.

The automatic transmission preferably includes an input clutch (starting clutch) connecting/disconnecting an input rotating member and an output rotating member and engages the input clutch and the normally closed engagement element to establish the first shift stage having the largest shift ratio of the forward shift stages. The input clutch is preferably a normally opened engagement element released when no oil pressure is supplied from the hydraulic circuit and more preferably a hydraulic friction engagement device such as a multiplate clutch.

A preferred embodiment of the present invention will now be described in detail with reference to the drawings.

First Embodiment

Figures 1, 2:
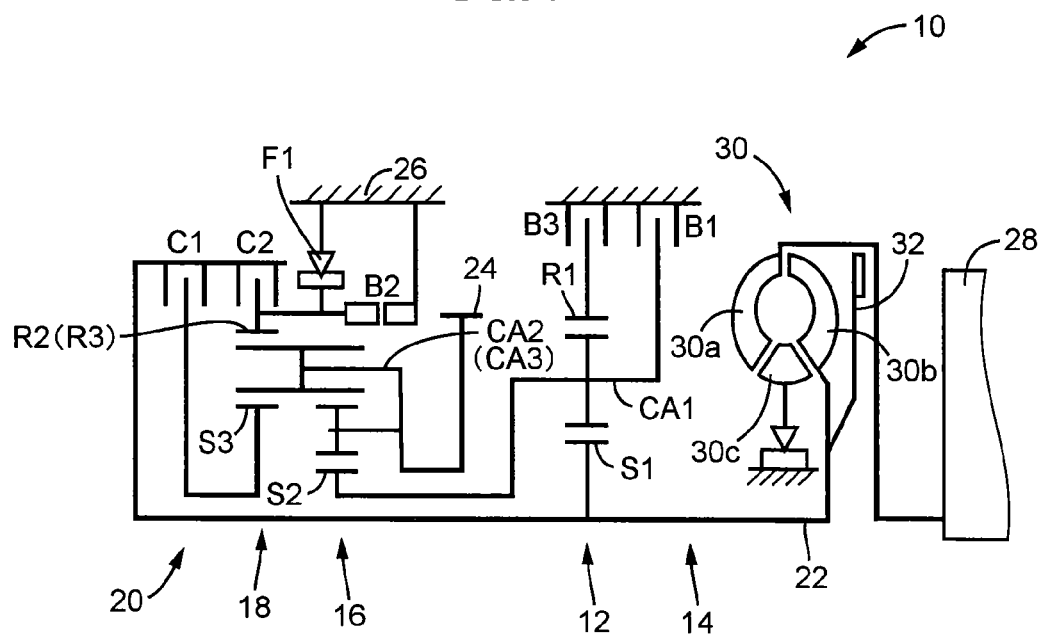
FIG. 1 is a schematic for explaining a configuration of a vehicle automatic transmission to which the present invention is preferably applied.
FIG. 2 is an operation table for explaining the operation state of the engagement elements when a plurality of shift stages is selectively established in the automatic transmission of FIG. 1 and depicts engagement/release of the engagement elements in a left column along with presence/absence of oil pressure supply in a right column.

FIG. 1 is a schematic for explaining a configuration of a vehicle automatic transmission 10 to which the present invention is preferably applied. As depicted in FIG. 1, the automatic transmission 10 of this embodiment is a transversely mounted device preferably used in an FF vehicle etc., and has a first transmission portion 14 mainly made up of a single pinion type first planetary gear device 12 and a second transmission portion 20 mainly made up of a double pinion type second planetary gear device 16 and a single pinion type third planetary gear device 18 on the same axis so as to change rotation of an input shaft 22 and output the rotation from an output rotating member 24. The input shaft 22 corresponds to an input rotating member and is a turbine shaft of a torque converter 30 rotationally driven by an engine 28 that is an internal combustion engine for generating power of a vehicle in this embodiment. The output rotating member 24 corresponds to an output member of the automatic transmission 10 and acts as an output gear, i.e., a differential drive gear, meshed with a differential driven gear (large diameter gear) for transmitting power to a differential gear device not depicted. The output of the engine 28 is transmitted through the torque converter 30, the automatic transmission 10, the differential gear device, and a pair of axles acting as a drive shaft to a pair of drive wheels (front wheels). The automatic transmission 10 is substantially symmetrically configured relative to a center line and the lower half from the center line is not depicted in FIG. 1. The same applies to the following description.

The engine 28 is a drive source (main power source) generating a drive force for running and is an internal combustion engine such as a gasoline engine and a diesel engine combusting fuel to generate a drive force of a vehicle. The torque converter 30 includes a pump impeller 30a coupled to a crankshaft of the engine 28, a turbine impeller 30b coupled to the input shaft 22 of the automatic transmission 10, and a stator impeller 30c coupled via a one-way clutch to a housing (transmission case) 26 of the automatic transmission 10 and is a fluid transmission device transmitting the power generated by the engine 28 through fluid to the automatic transmission 10. A lockup clutch 32 is a direct clutch disposed between the pump impeller 30a and the turbine impeller 30b and is put into an engaged state, a slip state, or a released state through hydraulic control etc. The lockup clutch 32 is put into a completely engaged state to integrally rotate the pump impeller 30a and the turbine impeller 30b.

The first planetary gear device 12 is a single pinion type planetary gear device including a sun gear S1, a plurality of pinion gears P1, a carrier CA1 supporting the pinion gears P1 in a rotatable and revolvable manner, and a ring gear R1 meshed with the sun gear S1 via the pinion gears P1. The second planetary gear device 16 and the third planetary gear device 18 are configured to be a Ravigneaux type with a ring gear R2 (R3) and a carrier CA2 (CA3) integrally configured. The second planetary gear device 16 is a double pinion type planetary gear device including a plurality of pinion gears P2 meshed with each other, supporting the pinion gears P2 in a rotatable and revolvable manner by the carrier CA2, and including a sun gear S2 meshed with the ring gear R2 via the pinion gears P2. The third planetary gear device 18 is a single pinion type planetary gear device including a plurality of pinion gears P3, supporting the pinion gears P3 in a rotatable and revolvable manner by the carrier CA3, and including a sun gear S3 meshed with the ring gear R3 via the pinion gears P3. The sun gear S1 of the first planetary gear device 12 is coupled to the input shaft 22. The carrier CA1 of the first planetary gear device 12 and the sun gear S2 of the second planetary gear device 16 are integrally coupled. The carrier CA2 of the second planetary gear device 16 (the carrier CA3 of the third planetary gear device 18) is coupled to the output rotating member 24.

The automatic transmission 10 includes a plurality of engagement elements having an engagement state switched by an oil pressure. In particular, a first clutch C1 selectively engaging the input shaft 22 and the sun gear S3 of the third planetary gear device 18 is disposed between the input shaft 22 and the sun gear S3. A second clutch C2 selectively engaging the input shaft 22 and the ring gear R2 of the second planetary gear device 16 (R3) is disposed between the input shaft 22 and the ring gear R2 (the ring gear R3 of the third planetary gear device 18). A first brake B1 selectively engaging the carrier CA1 (sun gear S2) to the housing 26, that is the non-rotating member, is disposed between the housing 26 and the carrier CA1 of the first planetary gear device 12 (the sun gear S2 of the second planetary gear device 16). A second brake B2 selectively engaging the ring gear R2 (R3) to the housing 26 is disposed between the housing 26 and the ring gear R2 of the second planetary gear device 16 (the ring gear R3 of the third planetary gear device 18). A third brake B3 selectively engaging the ring gear R1 to the housing 26 is disposed between the housing 26 and the ring gear R1 of the first planetary gear device 12.

FIG. 2 is an operation table for explaining the operation state of the engagement elements when a plurality of shift stages is selectively established in the automatic transmission 10 and depicts engagement/release of the engagement elements at each of the shift stages in a left column along with presence/absence of oil pressure supply to the engagement elements at the shift stages in a right column. The left column of FIG. 2 summarizes relationship between the shift stages established by the automatic transmission 10 and the operation states of the first clutch C1, the second clutch C2, the first brake B1, the second brake B2, and the third brake B3 (hereinafter referred to as clutches C and brakes B if not particularly distinguished) and "○" indicates engagement while a blank indicates release. The clutches C, the first brake B1, and the third brake B3 included in the automatic transmission 10 are hydraulic friction engagement devices subjected to engagement control by hydraulic actuators, such as multiplate clutches and brakes, and have the engaged and released state switched, and the transient oil pressures at the time of engagement and release controlled, by excitation/non-excitation and current control of a linear solenoid valve included in a hydraulic circuit 60 (see, e.g., FIG. 5).

The second brake B2 is a meshing engagement device (dog clutch) that includes a pair of engagement members having claw portions engaged with each other corresponding to the housing 26 acting as a non-rotating member and the ring gear R2 (R3) acting as a rotating member, and that has an engagement state switched by the pair of the engagement members relatively moved depending on an oil pressure supplied from the hydraulic circuit 60. The operation of the second brake B2 will be described with reference to FIGS. 5 and 6. As depicted in FIG. 2, the automatic transmission 10 is disposed with a unidirectional clutch F1 allowing the rotation of the ring gear R2 (R3) relative to the housing 26 in one direction and preventing the inverse rotation, in parallel with the second brake B2. When the unidirectional clutch F1 prevents the relative rotation of the ring gear R2 (R3) to the housing 26, the second brake B2 may not be engaged. The unidirectional clutch F1 may not necessarily be disposed.

The right column of FIG. 2 indicates the presence/absence of the generation of oil pressure (supply of oil pressure from the hydraulic circuit 60) to the engagement elements and "○" and "x" indicate the presence of the generation of oil pressure and the absence of the generation of oil pressure, respectively. As depicted in FIG. 2, the second brake B2 is associated with the absence of the generation of oil pressure when being engaged in accordance with the shift stages, and is associated with the presence of the generation of oil pressure when being released. Therefore, the second brake B2 is a normally closed engagement element engaged when no oil pressure is supplied from the hydraulic circuit 60 and released when an oil pressure is supplied. The clutches C, the first brake B1, and the third brake B3 are associated with the presence of the generation of oil pressure when being engaged in accordance with the shift stages, and are associated with the absence of the generation of oil pressure when being released. Therefore, the clutches C, the first brake B1, and the third brake B3 are normally opened engagement elements released when no oil pressure is supplied from the hydraulic circuit 60 and engaged when an oil pressure is supplied.

The automatic transmission 10 has six forward shift stages from a first shift stage "1st" to a sixth shift stage "6th" and a reverse shift stage of a reverse shift stage "R"

established depending on a combination of the coupling states of the rotating elements (the sun gears S1 to S3, the carriers CA1 to CA3, the ring gears R1 to R3) of the first transmission portion 14 and the second transmission portion 20. As depicted in FIG. 2, for example, with regard to the forward gear stages, the first shift stage "1st" having the largest shift ratio γ is established by the engagement of the first clutch C1 and the second brake B2. The second shift stage "2nd" having a shift ratio γ smaller than the first shift stage is established by the engagement of the first clutch C1 and the first brake B1. The third shift stage "3rd" having a shift ratio γ smaller than the second shift stage is established by the engagement of the first clutch C1 and the third brake B3. The fourth shift stage "4th" having a shift ratio γ smaller than the third shift stage is established by the engagement of the first clutch C1 and the second clutch C2. The fifth shift stage "5th" having a shift ratio γ smaller than the fourth shift stage is established by the engagement of the second clutch C2 and the third brake B3. The sixth shift stage "6th" having the smallest shift ratio γ is established by the engagement of the second clutch C2 and the first brake B1. A reverse shift stage "Rev" is established by the engagement of the second brake B2 and the third brake B3. The automatic transmission 10 is configured such that a neutral state is achieved by releasing all of the clutches C and the brakes B. Since the automatic transmission 10 of this embodiment is disposed with the unidirectional clutch F1 in parallel with the second brake B2 establishing the first shift stage "1st", the second brake B2 may not necessarily be engaged at the time of start (time of acceleration). The shift ratios of the shift stages are appropriately defined by gear ratios (=the number of teeth of sun gear/the number of teeth of ring gear) ρ1, ρ2, and ρ3 of the first planetary gear device 12, the second planetary gear device 16, and the third planetary gear device 18.

Figure 3:
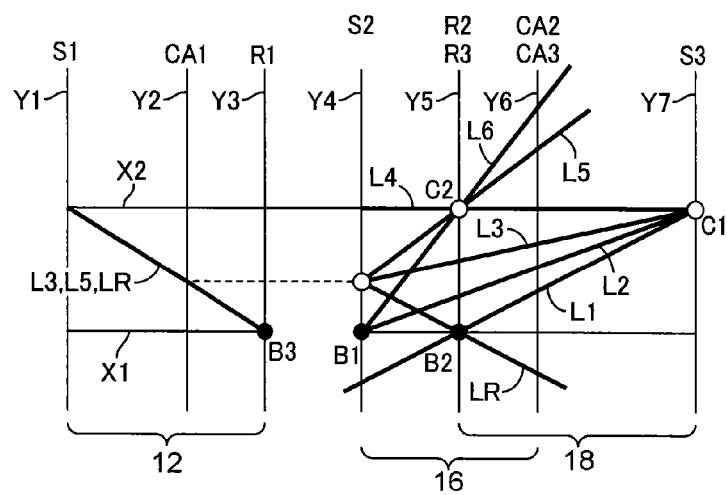
FIG. 3 is a collinear diagram capable of representing on straight lines the relative relationships of the rotation speeds of the rotating elements having a different coupling state for each shift stage in the automatic transmission of FIG. 1.

FIG. 3 is a collinear diagram capable of representing on straight lines the relative relationships of the rotation speeds of the rotating elements having a different coupling state for each shift stage in the automatic transmission 10. The collinear diagram of FIG. 3 has two-dimensional coordinates indicative of a relative relationship of the gear ratios ρ of the planetary gear devices 12, 16, and 18 in the horizontal axis direction and indicative of a relative rotation speed in the vertical axis direction. A horizontal line X1 indicates a zero rotation speed. An upper horizontal line X2 indicates a rotation speed "1.0", i.e., a rotation speed $N_{IN}$ of the input shaft 22. With regard to seven vertical lines Y1 to Y7, from left to right, Y1, Y2, Y3, Y4, Y5, Y6, and Y7 indicates relative rotation speeds of the sun gear S1 of the first planetary gear device 12, the carrier CA1, the ring gear R1, the sun gear S2 of the second planetary gear device 16, the ring gear R2 (R3), the carrier CA2 (CA3), and the sun gear S3 of the third planetary gear device 18, respectively. The intervals between the vertical lines Y1 to Y7 are determined depending on the gear ratios ρ1, ρ2, and ρ3 of the planetary gear devices 12, 16, and 18. In particular, for respective sets of the vertical lines Y1 to Y3 corresponding to the three rotation elements in the first planetary gear device 12, the vertical lines Y4 to Y6 corresponding to the three rotation elements in the second planetary gear device 16, and the vertical lines Y5 to Y7 corresponding to the three rotation elements in the third planetary gear device 18, the interval corresponding to "1" is set between the sun gear S and the carrier CA, and the interval corresponding to "ρ" is set between the carrier CA and the ring gear R.

When the automatic transmission 10 is represented by using the collinear diagram of FIG. 3, the input shaft 22 acting as the input rotating member is selectively coupled via the first clutch C1 to the sun gear S3 and is selectively coupled via the second clutch C2 to the ring gear R2 (R3). The carrier CA1 and the sun gear S2 coupled to each other are selectively coupled via the first brake B1 to the housing 26 that is the non-rotating member. The ring gear R2 (R3) is selectively coupled via the second brake B2 to the housing 26. The ring gear R1 is selectively coupled via the third brake B3 to the housing 26. The sun gear S1 is coupled to the input shaft 22. The carrier CA2 (CA3) is coupled to the output rotating member 24.

In the collinear diagram of FIG. 3, the relative relationships of the rotation speeds of the rotating elements are defined depending on a combination of engagement and release of the clutches C and the brakes B at the time of establishment of the shift stages. In FIG. 3, the relationship corresponding to the first shift stage "1st" is indicated by a straight line L1. The relationship corresponding to the second shift stage "2nd" is indicated by a straight line L2. The relationship corresponding to the third shift stage "3rd" is indicated by a straight line L3. The relationship corresponding to the fourth shift stage "4th" is indicated by a straight line L4. The relationship corresponding to the fifth shift stage "5th" is indicated by a straight line L5. The relationship corresponding to the sixth shift stage "6th" is indicated by a straight line L6. The relationship corresponding to the reverse shift stage "R" is indicated by a straight line LR. In the collinear diagram of FIG. 3, since one drawing is used for representing the relative relationships of the rotation speeds of the rotating elements related to all the shift stages achievable in the automatic transmission 10, the straight lines L1 to L6 and LR are necessarily straight lines between the planetary gear devices 12, 16, and 18; however, the rotation speeds of the rotating elements in the planetary gear devices 12, 16, and 18 are equally represented depending on the engagement states of the clutches C and the brakes B so as to completely represent the relative rotation speeds of the seven rotating elements of the automatic transmission 10 at the shift stages.

As depicted in FIG. 3, in the automatic transmission 10, the rotation speed of the output rotating member 24 at the first shift stage "1st" is indicated by an intersection between the straight line L1 defined when the first clutch C1 and the second brake B2 are engaged and the vertical line Y6 indicative of the rotation speed of the carrier CA2 (CA3) coupled to the output rotating member 24. The rotation speed of the output rotating member 24 at the second shift stage "2nd" is indicated by an intersection between the straight line L2 defined when the first clutch C1 and the first brake B1 are engaged and the vertical line Y6. The rotation speed of the output rotating member 24 at the third shift stage "3rd" is indicated by an intersection between the straight line L3 defined when the first clutch C1 and the third brake B3 are engaged and the vertical line Y6. The rotation speed of the output rotating member 24 at the fourth shift stage "4th" is indicated by an intersection between the straight line L4 defined when the first clutch C1 and the second clutch C2 are engaged and the vertical line Y6. The rotation speed of the output rotating member 24 at the fifth shift stage "5th" is indicated by an intersection between the straight line L5 defined when the second clutch C2 and the third brake B3 are engaged and the vertical line Y6. The rotation speed of the output rotating member 24 at the sixth shift stage "6th" is indicated by an intersection between the straight line L6 defined when the second clutch C2 and the first brake B1 are engaged and the vertical line Y6. The rotation speed of the output rotating member 24 at the reverse shift stage "R" is indicated by an intersection between the straight line LR defined when the second brake B2 and the third brake B3 are engaged and the vertical line Y6.

Figure 4:
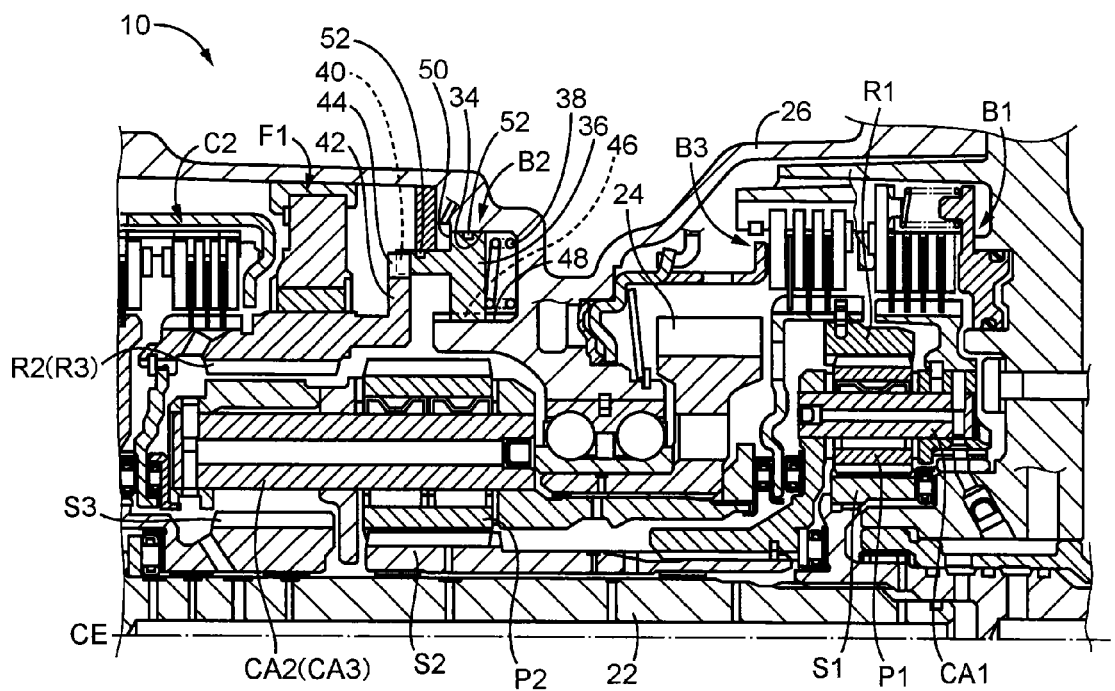
FIG. 4 is a partial cross-sectional view of a partial configuration of the automatic transmission taken along a plane including a center axis for explaining a normally closed engagement element included in the automatic transmission of FIG. 1.

FIG. 4 is a partial cross-sectional view of a partial configuration of the automatic transmission 10 taken along a plane including a center axis for explaining configurations of the second brake B2 etc. As depicted in FIG. 4, the second brake B2 includes a cylinder portion 34 formed on the inner circumferential side of the housing 26, a piston 36 disposed in the cylinder portion 34 to be reciprocable in the direction of a center axis CE of the automatic transmission 10, and a spring 38 biasing the piston 36 in the engagement direction of claw portions 40 and 44 described later. The claw portion 40 is formed at an end portion of the piston 36 on the ring gear R2 (R3) side. An extended portion 42 extending toward the outer circumferential side is formed on the piston 36 side of the ring gear R2 (R3) and has an outer-circumferential-side end portion provided with the claw portion 44 intermeshed with the claw portion 40 of the piston 36. A groove portion 46 is formed in the center axis direction on the inner circumferential side of the piston 36 and is fit to a groove portion 48 formed in the cylinder portion 34 such that the piston 36 is prevented from rotating relative to the cylinder portion 34 around the center axis CE and is allowed to relatively move in the center axis CE direction. An oil chamber 50 is formed between the cylinder portion 34 (housing 26) and the piston 36 and the oil chamber 50 is made oil-tight by an oil seal 52 disposed on the piston 36. Therefore, with regard to the second brake B2, the ring gear R2 (R3) and the piston 36 correspond to a pair of the engagement members having the claw portions 40 and 44 engaged with each other.

Figure 5:
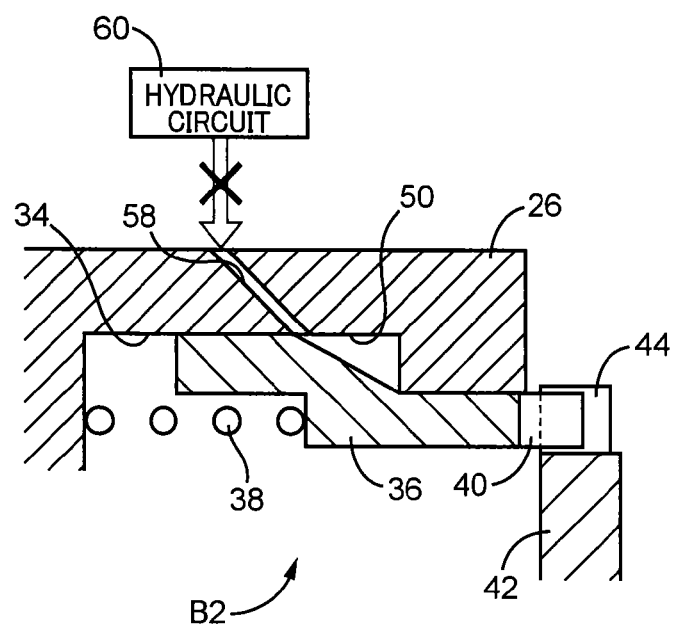
FIG. 5 is a schematic of a cross section for generally explaining the operation of the normally closed engagement element included in the automatic transmission of FIG. 1 and depicts an engaged state of the engagement element.
Figure 6:
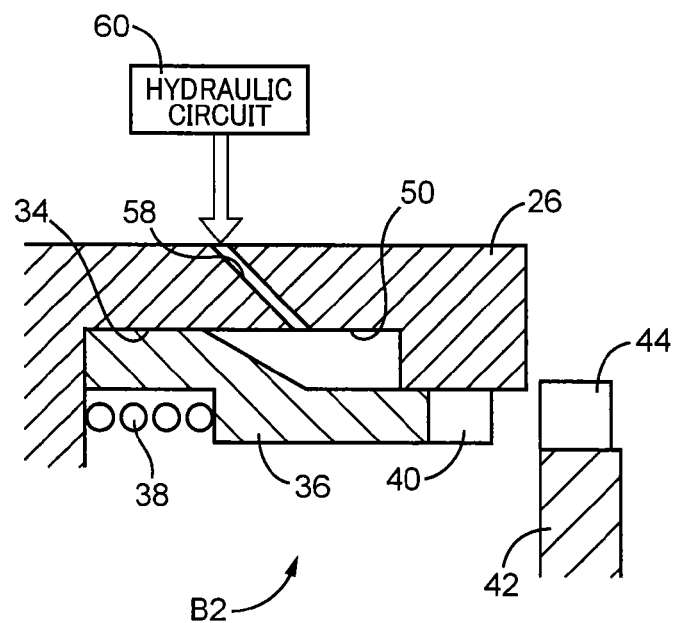
FIG. 6 is a schematic of a cross section for generally explaining the operation of the normally closed engagement element included in the automatic transmission of FIG. 1 and depicts a released state of the engagement element.

FIGS. 5 and 6 are schematics of cross sections for generally explaining the operation of the second brake B2 and FIGS. 5 and 6 depict an engaged state and a released state, respectively, of the second brake B2. As depicted in FIGS. 5 and 6, the oil chamber 50 formed between the cylinder portion 34 and the piston 36 is supplied with an oil pressure via an oil passage 58 from the hydraulic circuit 60 in this configuration. While an oil pressure (an oil pressure generating at least a force pushing back the spring 38 in the axial center direction of the piston 36) is not supplied from the hydraulic circuit 60 to the oil chamber 50, as depicted in FIG. 5, the piston 36 is pushed by a biasing force of the spring 38 toward the extended portion 42 of the ring gear R2 (R3), and the claw portions 40 and 44 respectively disposed on the piston 36 and the extended portion 42 are meshed with each other. In other words, the second brake B2 is engaged. Since the piston 36 is made non-rotatable relative to the housing 26 by the groove portion 46 on the inner circumferential side fit to the groove portion 48 of the cylinder portion 34, and the relative rotation of the piston 36 and the ring gear R2 (R3) around the axial center is prevented by the claw portions 40 and 44 meshed with each other, the ring gear R2 (R3) is prevented from rotating relative to the housing 26 in the state depicted in FIG. 5. While an oil pressure (an oil pressure generating at least a force pushing back the spring 38 in the axial center direction of the piston 36) is supplied from the hydraulic circuit 60 to the oil chamber 50, as depicted in FIG. 6, the piston 36 is pushed against the biasing force of the spring 38 toward the side opposite to the extended portion 42 of the ring gear R2 (R3), and the meshing (engagement) of the claw portions 40 and 44 respectively disposed on the piston 36 and the extended portion 42 are released. In other words, the second brake B2 is released. In the state depicted in FIG. 6, the ring gear R2 (R3) is allowed to rotate relative to the housing 26.

Another preferred embodiment of the present invention will be described in detail with reference to the drawings. In the following description, the portions mutually common to the embodiments are denoted by the same reference numerals and will not be described.

Second Embodiment

Figures 7, 8:
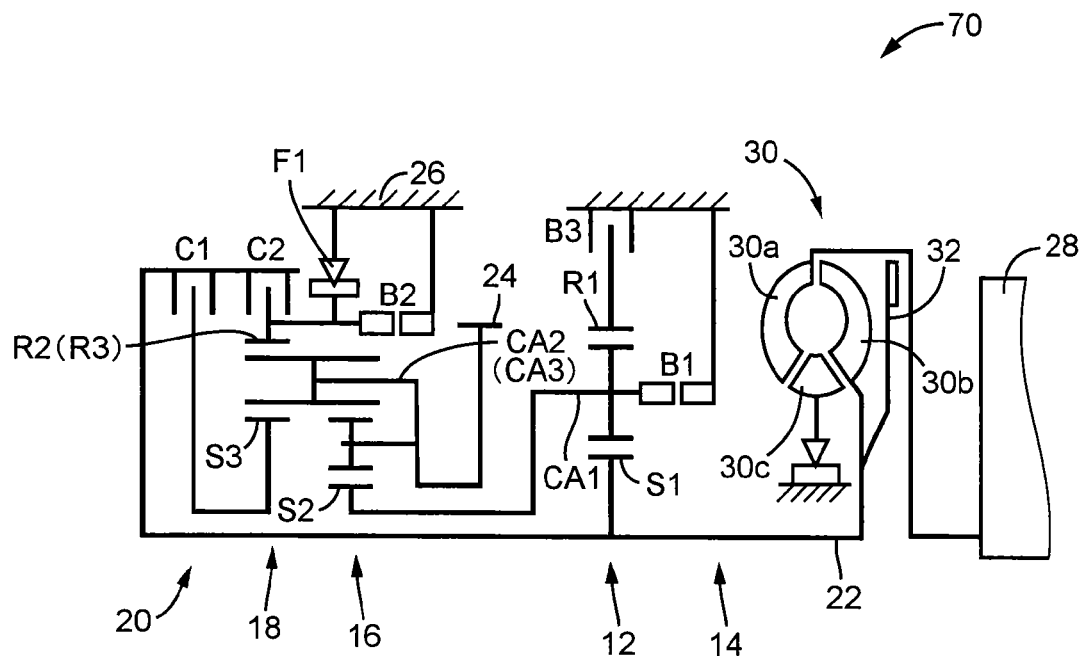
FIG. 7 is a schematic for explaining a configuration of another vehicle automatic transmission to which the present invention is preferably applied.
FIG. 8 is an operation table for explaining the operation state of the engagement elements when a plurality of shift stages is selectively established in the automatic transmission of FIG. 7 and depicts engagement/release of the engagement elements in a left column along with presence/absence of oil pressure supply in a right column.
Figure 9:
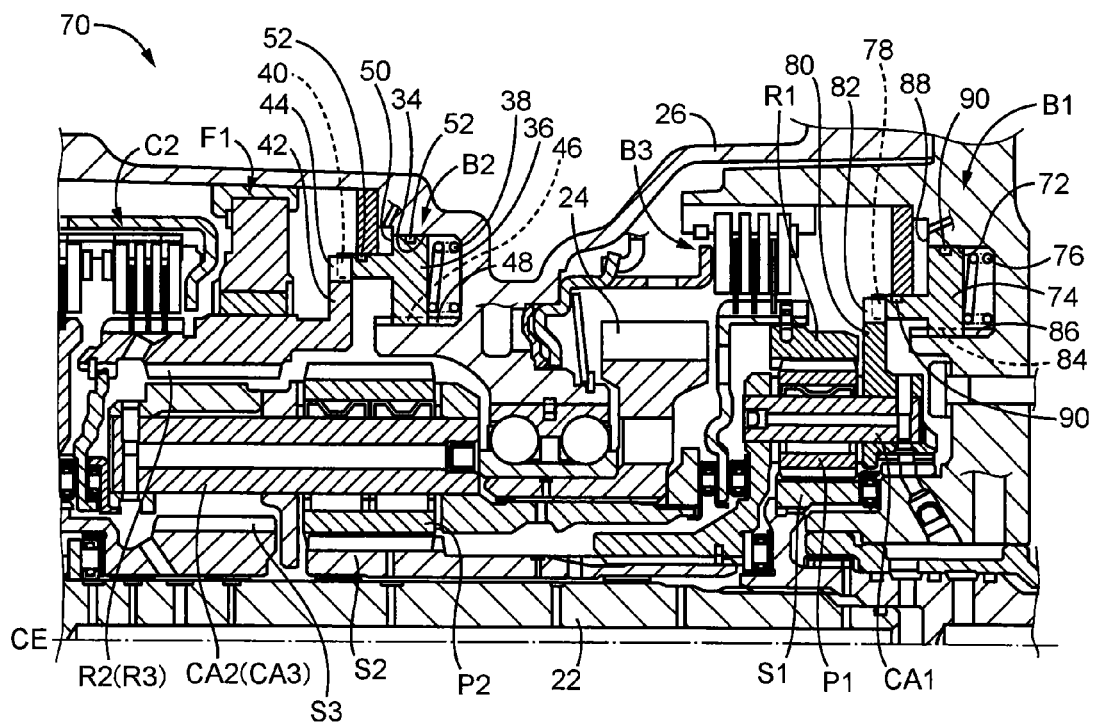
FIG. 9 is a partial cross-sectional view of a partial configuration of the automatic transmission taken along a plane including a center axis for explaining normally closed engagement elements included in the automatic transmission of FIG. 7.

FIG. 7 is a schematic for explaining a configuration of another vehicle automatic transmission 70 to which the present invention is preferably applied. As depicted in FIG. 7 and FIG. 9 described later, the vehicle automatic transmission 70 of this embodiment includes a first brake B1 that is a meshing engagement element as a substitute for the first brake B1 that is a hydraulic friction engagement device (friction brake) included in the automatic transmission 10. This first brake B1 is a meshing engagement device (dog clutch) that includes a pair of engagement members having claw portions engaged with each other corresponding to the housing 26 acting as a non-rotating member and the carrier CA1 (sun gear S2) acting as a rotating element, and that has an engagement state switched by the pair of the engagement members relatively moved depending on an oil pressure supplied from the hydraulic circuit 60.

FIG. 8 is an operation table for explaining the operation state of the engagement elements when a plurality of shift stages is selectively established in the automatic transmission 70 and depicts engagement/release of the engagement elements at each of the shift stages in a left column along with presence/absence of oil pressure supply to the engagement elements at the shift stages in a right column. As depicted in the right column of FIG. 8, the first brake B1 and the second brake B2 are associated with the absence of the generation of oil pressure when being engaged in accordance with the shift stages, and are associated with the presence of the generation of oil pressure when being released. Therefore, the first brake B1 and the second brake B2 are normally closed engagement elements engaged when no oil pressure is supplied from the hydraulic circuit 60 and released when an oil pressure is supplied. The clutches C and the third brake B3 are associated with the presence of the generation of oil pressure when being engaged in accordance with the shift stages, and are associated with the absence of the generation of oil pressure when being released. Therefore, the clutches C and the third brake B3 are normally opened engagement elements released when no oil pressure is supplied from the hydraulic circuit 60 and engaged when an oil pressure is supplied. The relative rotation speeds corresponding to the coupled states of the rotating elements in the automatic transmission 70 are described with reference to FIG. 3 described above.

FIG. 9 is a partial cross-sectional view of a partial configuration of the automatic transmission 70 taken along a plane including a center axis for explaining configurations of the first brake B1 etc. As depicted in FIG. 9, the first brake B1 includes a cylinder portion 72 formed on the inner circumferential side of the housing 26, a piston 74 disposed in the cylinder portion 72 to be reciprocable in the direction of the center axis CE of the automatic transmission 70, and a spring 76 biasing the piston 74 in the engagement direction of claw portions 78 and 82 described later. The claw portion 78 is formed at an end portion of the piston 74 on the carrier CA1 side. An extended portion 80 extending toward the outer circumferential side is formed on the piston 74 side of the carrier CA1 and has an outer-circumferential-side end portion provided with the claw portion 82 intermeshed with the claw portion 78 of the piston 74. A groove portion 84 is formed in the center axis direction on the inner circumferential side of the piston 74 and is fit to a groove portion 86 formed in the cylinder portion 72 such that the piston 74 is prevented from rotating relative to the cylinder portion 72 around the center axis CE and is allowed to relatively move in the center axis CE direction. An oil chamber 88 is formed between the cylinder portion 72 (housing 26) and the piston 74 and the oil chamber 88 is made oil-tight by an oil seal 90 disposed on the piston 74. Therefore, with regard to the first brake B1, the carrier CA1 (the mutually coupled sun gear S2) and the piston 74 correspond to a pair of the engagement members having the claw portions 78 and 82 engaged with each other.

The first brake B1 configured as described above is operated in the same way as the second brake B2 described with reference to FIGS. 5 and 6. In particular, while an oil pressure (an oil pressure generating at least a force pushing back the spring 76 in the axial center direction of the piston 74) is not supplied from the hydraulic circuit 60 to the oil chamber 88, the piston 74 is pushed by a biasing force of the spring 76 toward the carrier CA1, and the claw portions 78 and 82 respectively disposed on the piston 74 and the extended portion 80 are meshed with each other. In other words, the first brake B1 is engaged. Since the piston 74 is made non-rotatable relative to the housing 26 by the groove portion 84 on the inner circumferential side fit to the groove portion 86 of the cylinder portion 72, and the relative rotation of the piston 74 and the carrier CA1 (sun gear S2) around the axial center is prevented by the claw portions 78 and 82 meshed with each other, the carrier CA1 is prevented from rotating relative to the housing 26 in this state. While an oil pressure (an oil pressure generating at least a force pushing back the spring 76 in the axial center direction of the piston 74) is supplied from the hydraulic circuit 60 to the oil chamber 88, the piston 74 is pushed against the biasing force of the spring 76 toward the side opposite to the extended portion 80 of the carrier CA1, and the meshing (engagement) of the claw portions 78 and 82 respectively disposed on the piston 74 and the extended portion 80 are released. In other words, the first brake B1 is released. In this state, the carrier CA1 (sun gear S2) is allowed to rotate relative to the housing 26.

As depicted in FIGS. 7 to 9, the automatic transmission 70 includes the first brake B1 and the second brake B2 that are normally closed meshing brakes engaged during the absence of the generation of oil pressure when no oil pressure is supplied from the hydraulic circuit 60. The first brake B1 and the second brake B2 are engaged to fix the carrier CA1 (sun gear S2) and the ring gear R2 (R3), respectively, to the housing 26 that is the non-rotating member. The carrier CA1 (sun gear S2) and the ring gear R2 (R3) are rotating elements of the automatic transmission 70 and mechanically (indirectly) coupled to the output rotating member 24 via the second planetary gear device 16 and the third planetary gear device 18 both configured to be a Ravigneaux type. In this configuration, during the absence of the generation of oil pressure when no oil pressure is supplied from the hydraulic circuit 60, the first brake B1 and the second brake B2 are engaged, and the rotation of the carrier CA2 (CA3) directly coupled to the output rotating member 24 is prevented by the carrier CA1 (sun gear S2) and the ring gear R2 (R3). In other words, the output rotating member 24 can be locked by fixing the carrier CA1 (sun gear S2) and the ring gear R2 (R3), which are directly or indirectly coupled to the output rotating member 24, to the housing 26.

As described above, according to this embodiment, in the vehicle automatic transmission 10 or 70 of a multistage type including multiple engagement elements having an engagement state switched by an oil pressure, i.e., the first clutch C1, the second clutch C2, the first brake B1, the second brake B2, and the third brake B3, to selectively establish a plurality of shift stages based on a combination of engagement and release of the multiple engagement elements corresponding to an oil pressure supplied from the hydraulic circuit 60, at least one of the multiple engagement elements is a normally closed engagement element engaged when no oil pressure is supplied from the hydraulic circuit 60 and, therefore, the limitation on the configuration of the hydraulic circuit 60 becomes smaller and an oil pump can be reduced in size. Thus, the vehicle automatic transmission 10, 70 with a simplified device configuration can be provided.

Since the normally closed engagement elements, i.e., the first brake B1 and the second brake B2, are meshing engagement elements, the occurrence of drag can preferably be suppressed by including at least one meshing engagement element engaged when no oil pressure is supplied from the hydraulic circuit 60, in addition to the simplified configuration.

In the automatic transmissions 10 and 70, when the first shift stage having the largest shift ratio of the forward shift stages is established, at least one engagement element of the multiple engagement elements engaged is the second brake B2 and is the normally closed engagement element and, therefore, the automatic transmissions 10 and 70 can be provided that have a simplified configuration in a practical form. Additionally, a garage shock at the engine start can be reduced.

In the automatic transmissions 10 and 70, when the reverse shift stage is established, at least one engagement element of the multiple engagement elements engaged is the second brake B2 and is the normally closed engagement element and, therefore, the automatic transmissions 10 and 70 can be provided that have a simplified configuration in a practical form.

In the automatic transmissions 10 and 70, when the first shift stage is established, at least one engagement element of the multiple engagement elements engaged is the first clutch C1 and is the normally opened engagement element released when no oil pressure is supplied from the hydraulic circuit 60 and, therefore, the automatic transmissions 10 and 70 can be provided that have a simplified configuration in a practical form.

In the automatic transmissions 10 and 70, when the reverse shift stage is established, at least one engagement element of the multiple engagement elements engaged is the third brake B3 and is the normally opened engagement element released when no oil pressure is supplied from the hydraulic circuit 60 and, therefore, the automatic transmissions 10 and 70 can be provided that have a simplified configuration in a practical form.

Since the two meshing brakes B1 and B2 are included as the normally closed engagement elements, and the carrier CA1 (sun gear S2) and the ring gear R2 (R3) are the rotating members fixed to the housing 26 acting as the non-rotating member by the engagement of the respective meshing brakes B1 and B2, and are directly or indirectly coupled to the output rotating member 24 of the automatic transmission 70, the automatic transmission 70 can be provided that has a simplified configuration in a practical form and, additionally, because the output rotating member 24 is fixed to the housing 26 while no oil pressure is supplied from the hydraulic circuit 60, the necessity of a configuration for a parking lock is advantageously eliminated.

Although the embodiments of the present invention have been described in detail with reference to the drawings, the present invention is not limited thereto and is implemented in other forms.

For example, although the automatic transmissions 10 and 70 have the shift stages established by engagement of any two engagement elements of the multiple engagement elements in the embodiments, this is not a limitation of the present invention and, for example, the shift stages may be established by engagement of three or more engagement elements of the multiple engagement elements. Preferably, in this automatic transmission, the two meshing brakes (a meshing engagement element caused to engage a rotating member to a non-rotating member) are included as the normally closed engagement elements, and the rotating elements fixed to the non-rotating member by the engagement of the respective meshing brakes are directly or indirectly coupled to the output rotating member. Consequently, the automatic transmission can be provided that has a simplified configuration in a practical form and, additionally, because an output shaft is fixed to the non-rotating member while no oil pressure is supplied from the hydraulic circuit, the necessity of a configuration for a parking lock is advantageously eliminated.

Although not exemplarily illustrated one by one, the present invention is implemented with various modifications applied without departing from the spirit thereof.

NOMENCLATURE OF ELEMENTS 10, 70: vehicle automatic transmission 12: first planetary gear device 14: first transmission portion 16: second planetary gear device 18: third planetary gear device 20: second transmission portion 22: input shaft 24: output rotating member 26: housing (non-rotating member) 28: engine 30: torque converter 30a: pump impeller 30b: turbine impeller 30c: stator impeller 32: lockup clutch 34: cylinder portion 36: piston 38: spring 40, 44: claw portions 42: extended portion 46, 48: groove portions 50: oil chamber 52: oil seal 58: oil passage 60: hydraulic circuit 72: cylinder portion 74: piston 76: spring 78, 82: claw portions 80: extended portion 84, 86: groove portions 88: oil chamber 90: oil seal B1: first brake (engagement element) B2: second brake (engagement element) B3: third brake (engagement element) C1: first clutch (engagement element) C2: second clutch (engagement element) CA1, CA2, CA3: carrier CE: center axis F1: unidirectional clutch P1, P2, P3: pinion gears S1, S2, S3: sun gear R1, R2, R3: ring gear

The invention claimed is:

1. A vehicle automatic transmission comprising:
multiple engagement elements including an engagement state switched by an oil pressure to selectively establish a plurality of shift stages based on a combination of engagement and release of the multiple engagement elements according to an oil pressure supplied from a hydraulic circuit,
each of the shift stages being established by engagement of two or more engagement elements of the multiple engagement elements,
at least one of the multiple engagement elements being a normally closed engagement element engaged when no oil pressure is supplied from the hydraulic circuit, and
the normally closed engagement element being a meshing engagement element,
wherein when a first shift stage including a largest shift ratio of forward shift stages is established in the automatic transmission, at least one of the multiple engagement elements engaged is the normally closed engagement element, and at least one of the multiple engagement elements engaged is a normally opened engagement element released when no oil pressure is supplied from the hydraulic circuit, and
wherein two meshing brakes are included as the normally closed engagement elements, and rotating elements fixed to a non-rotating member by engagement of the respective meshing brakes are directly or indirectly coupled to an output rotating member of the automatic transmission.

2. A vehicle automatic transmission comprising:
multiple engagement elements including an engagement state switched by an oil pressure to selectively establish a plurality of shift stages based on a combination of engagement and release of the multiple engagement elements according to an oil pressure supplied from a hydraulic circuit,
each of the shift stages being established by engagement of two or more engagement elements of the multiple engagement elements,
at least one of the multiple engagement elements being a normally closed engagement element engaged when no oil pressure is supplied from the hydraulic circuit,
the normally closed engagement element being a meshing engagement element, and
wherein when a reverse shift stage is established in the automatic transmission, at least one of the multiple engagement elements engaged is the normally closed engagement element, and at least one of the multiple engagement elements engaged is a normally opened engagement element released when no oil pressure is supplied from the hydraulic circuit.

3. The vehicle automatic transmission of claim 1, wherein the normally closed engagement element, which is engaged when no oil pressure is supplied from the hydraulic circuit, is released when an oil pressure is supplied from the hydraulic circuit.

4. The vehicle automatic transmission of claim 2, wherein two meshing brakes are included as the normally closed engagement elements, and wherein rotating elements fixed to a non-rotating member by engagement of the respective meshing brakes are directly or indirectly coupled to an output rotating member of the automatic transmission.

5. The vehicle automatic transmission of claim 2, wherein the normally closed engagement element, which is engaged when no oil pressure is supplied from the hydraulic circuit, is released when an oil pressure is supplied from the hydraulic circuit.

6. A vehicle automatic transmission comprising:
a single pinion first planetary gear device including a first sun gear connected to an input shaft of the vehicle automatic transmission, a first carrier, and a first ring gear;
a double pinion second planetary gear device including a second sun gear connected to the first carrier, a second carrier connected to an output rotating member of the vehicle automatic transmission, and a second ring gear;
a double pinion third planetary gear device including a third sun gear, a third carrier connected to the second carrier, and a third ring gear connected to the second ring gear; and
multiple engagement elements including an engagement state switched by an oil pressure to selectively establish a plurality of shift stages based on a combination of engagement and release of the multiple engagement elements according to an oil pressure supplied from a hydraulic circuit, wherein each of the shift stages is established by engagement of two or more engagement elements of the multiple engagement elements, the multiple engagement elements include: a first clutch configured to selectively engage the input shaft with the third sun gear; a second clutch configured to selectively engage the input shaft with the second and third ring gears; a first brake configured to selectively engage the first carrier and the second sun gear with a non-rotating member of the vehicle automatic transmission; a second brake configured to selectively engage the second and third ring gears with the non-rotating member; and a third brake configured to selectively engage the first ring gear with the non-rotating member, at least one of the multiple engagement elements is a normally closed engagement element engaged when no oil pressure is supplied from the hydraulic circuit, the normally closed engagement element is a meshing engagement element, and when a first shift stage including a largest shift ratio of forward shift stages is established in the automatic transmission, at least one of the multiple engagement elements engaged is the normally closed engagement element, and at least one of the multiple engagement elements engaged is a normally opened engagement element released when no oil pressure is supplied from the hydraulic circuit.

7. The vehicle automatic transmission of claim 6, wherein the at least one of the multiple engagement elements consists of at least one of the first brake and the second brake.

8. The vehicle automatic transmission claim 7, wherein the plurality of shift stages include the first shift stage, a second shift stage including a shift ratio smaller than the first shift stage, a third shift stage including a shift ratio smaller than the second shift stage, a fourth shift stage including a shift ratio smaller than the third shift stage, a fifth shift stage including a shift ratio smaller than the fourth shift stage, a sixth shift stage including a shift ratio smaller than the fifth shift stage, and a reverse shift stage, wherein the first shift stage is established by engagement of the first clutch and the second brake and release of the second clutch and the first and third brakes, wherein the second shift stage is established by engagement of the first clutch and the first brake and release of the second clutch and the second and third brakes, wherein the third shift stage is established by engagement of the first clutch and the third brake and release of the second clutch and the first and second brakes, wherein the fourth shift stage is established by engagement of the first and second clutches and release of the first, second and third brakes, wherein the fifth shift stage is established by engagement of the second clutch and the third brake and release of the first clutch and the first and second brakes, wherein the sixth shift stage is established by engagement of the second clutch and the first brake and release of the first clutch and the second and third brakes, and wherein the reverse shift stage is established by engagement of the second and third brakes and release of the first and second clutches and the first brake.

* * * * *